W. BANNERMAN.
SHIPPING BLANKS.
APPLICATION FILED OCT. 24, 1913.

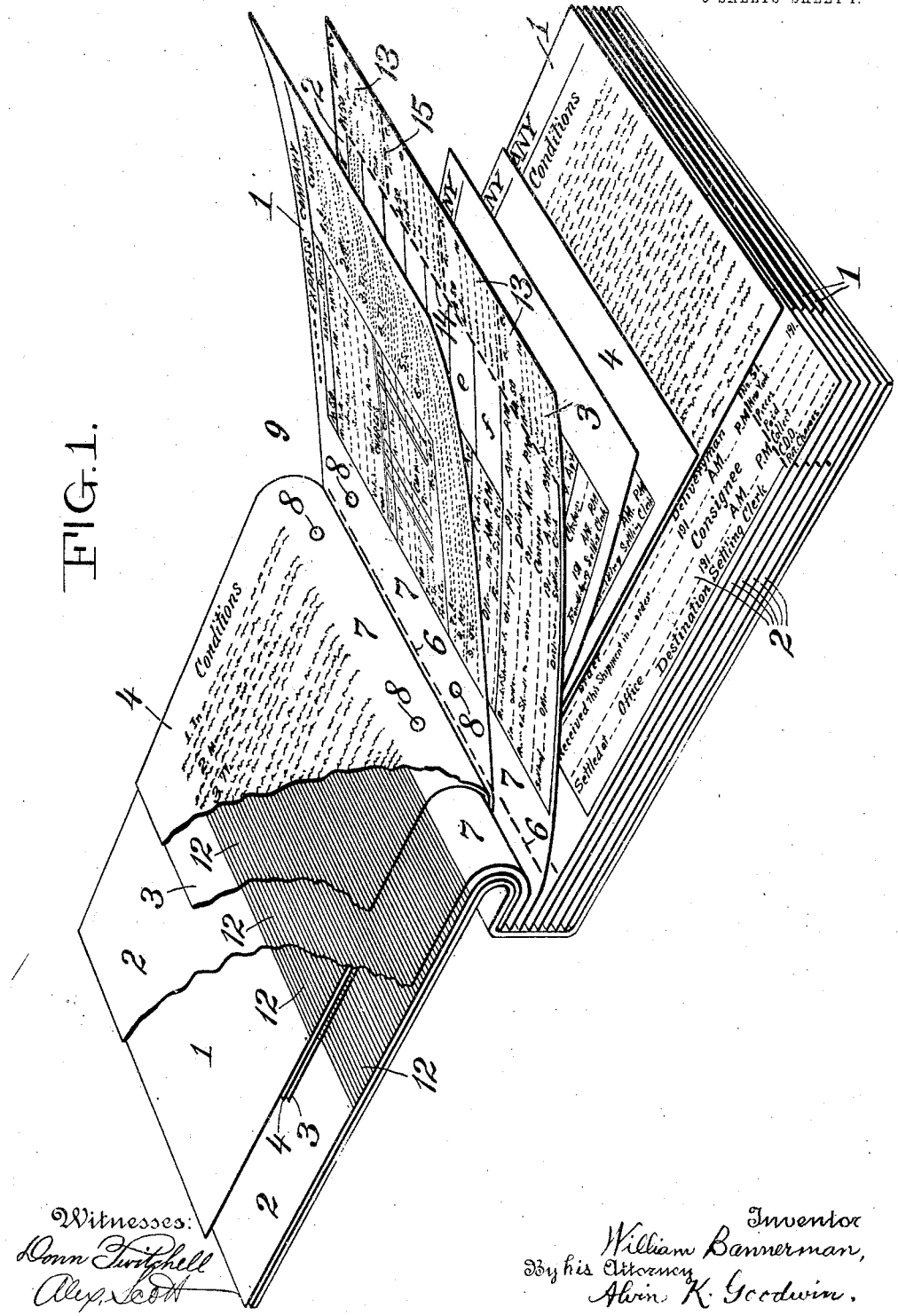

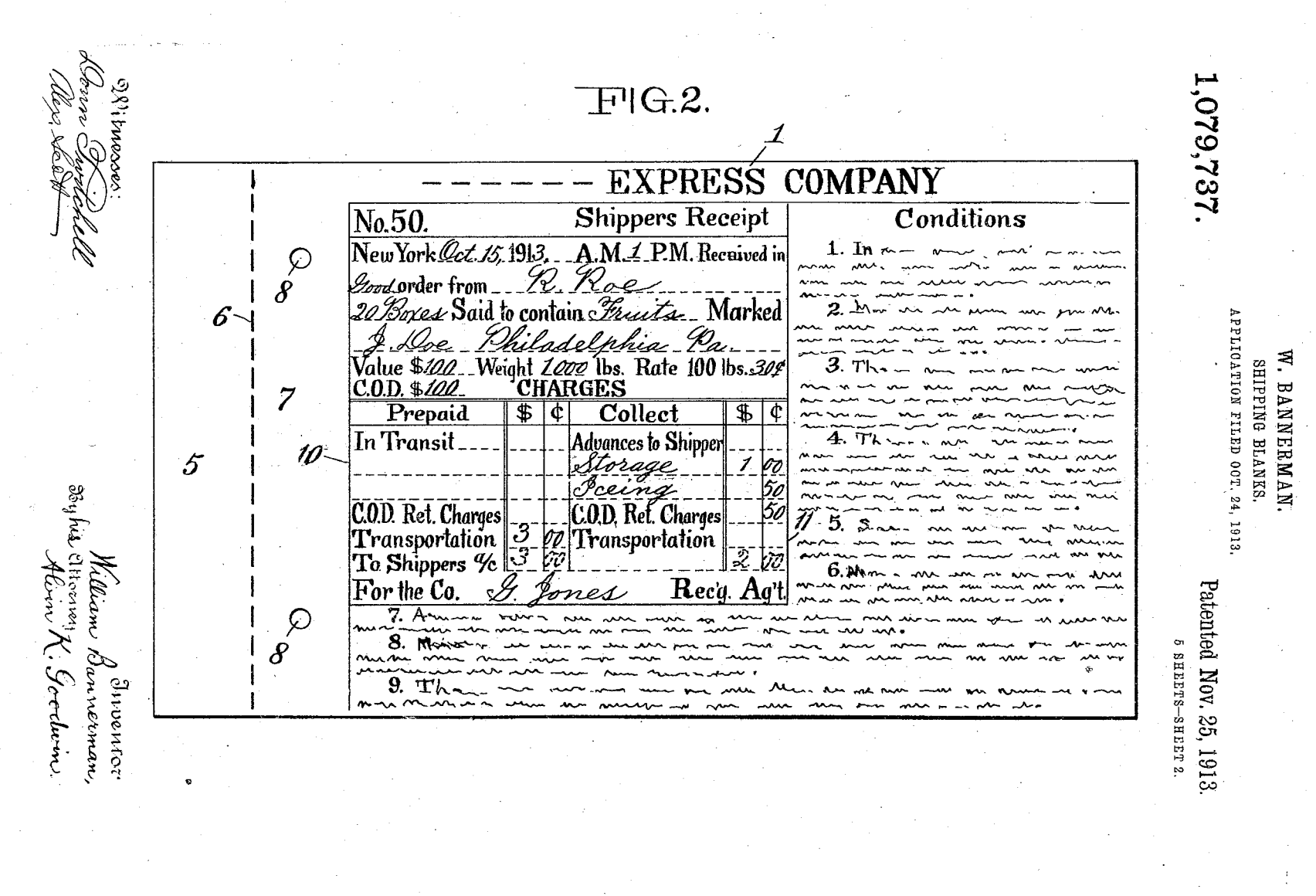

1,079,737.

Patented Nov. 25, 1913.

5 SHEETS—SHEET 2.

W. BANNERMAN.
SHIPPING BLANKS.
APPLICATION FILED OCT. 24, 1913.

1,079,737.

Patented Nov. 25, 1913.

5 SHEETS—SHEET 3.

FIG. 3.

W. BANNERMAN.
SHIPPING BLANKS.
APPLICATION FILED OCT. 24, 1913.

1,079,737.  
Patented Nov. 25, 1913.  
5 SHEETS—SHEET 4.

FIG. 4.

EXPRESS COMPANY
Auditors Record

No. 50. New York Oct. 15, 1913. A.M. 1 P.M. Received in Good order from R. Roe 20 Boxes, Said to contain Fruits. Marked J. Doe Philadelphia Pa. Value $100 Weight 100 lbs. Rate 100 lbs. 30¢ C.O.D. $200

CHARGES

| Prepaid | $ | ¢ | Collect | $ | ¢ |
|---|---|---|---|---|---|
| In Transit | | | Advances to Shipper | 1 | 00 |
| | | | Storage | | 50 |
| | | | Icing | | 50 |
| C.O.D. Rt. Charges Transportation | 3 | 00 | C.O.D. Rt. Charges Transportation | 2 | 00 |
| To Shippers %c | 3 | 00 | | | |

For the Co. G. Jones  Rec'g. Ag't.
Corrections Rates 25¢ Deduct 50¢ Checker 18
Settled at Warehouse Office Oct. 15, 1913. A.M. 4 P.M.
C. Burt  Forwarding Settling Clerk Witnesses:  
Donn Twitchell  
Alex Scott Inventor  
William Bannerman,  
By his Attorney  
Alvin K. Goodwin.

W. BANNERMAN.
SHIPPING BLANKS.
APPLICATION FILED OCT. 24, 1913.

1,079,737.

Patented Nov. 25, 1913.
5 SHEETS—SHEET 5.

FIG. 5.

EXPRESS COMPANY

No. 50.   Forwarding Office Record

New York Oct. 15, 1913.   A.M. 1 P.M. Received in Good order from R. Roe

20 Boxes Said to contain Fruits Marked J. Doe Philadelphia Pa.

Value $100. Weight 1000 lbs. Rate 100 lbs. 30¢
C.O.D. $100.

CHARGES

| Prepaid | $ | ¢ | Collect | $ | ¢ |
|---|---|---|---|---|---|
| In Transit | | | Advances to Shipper | | |
| | | | Storage | 1 | 00 |
| | | | Iceing | | 50 |
| C.O.D. Ret. Charges | | | C.O.D. Ret. Charges | | 50 |
| Transportation | 3 | 00 | Transportation | | |
| To Shippers %  | 3 | 00 | | 2 | 00 |

For the Co.  G. Jones   Rec'g Ag't.

Corrections Rate is 25¢ Deduct 50¢ Checker 18.
Settled at Park Ave. Office Oct. 15, 1913. A.M. 4 P.M.
C. Burr   Forwarding Settling Clerk

FIG. 6.

Conditions
1. In ...
2. M ...
3. The ...
4. Th ...

Witnesses:
Donn Twitchell
Alex Scott

Inventor
William Bannerman,
By his Attorney
Alvin K. Goodwin.

UNITED STATES PATENT OFFICE.

WILLIAM BANNERMAN, OF NEW YORK, N. Y.

SHIPPING-BLANKS.

1,079,737. Specification of Letters Patent. Patented Nov. 25, 1913.

Continuation of application Serial No. 690,851, filed April 15, 1912. This application filed October 24, 1913.
Serial No. 797,001.

*To all whom it may concern:*

Be it known that I, WILLIAM BANNERMAN, a subject of the King of Great Britain, residing in the city, county, and State of New York, have invented certain new and useful Improvements in Shipping-Blanks, of which the following is a specification.

This invention relates to a novel system of imprinted blanks useful by express, railway and boat forwarders, hereinafter referred to as the "carrier" in transporting goods or mails in the ordinary course of mercantile business.

The objects of this invention are to make unnecessary the tedious and expensive handwriting of way-bills for the goods shipments prior to starting them from the carrier's first forwarding office toward destination, to protect the shipper and consignee from overcharges by the carrier's employees or agents, and to protect the carrier from temporary withholding or theft of money or goods by its employees, and to assure forwarding of goods under the most favorable conditions avoiding delay or loss in transit, and to provide for safe and prompt delivery at destination, and to materially lessen the clerical labor necessary for effecting financial settlements regarding the shipments.

Reference is made to the accompanying drawings forming part of this specification, and in which—

Figure 3:
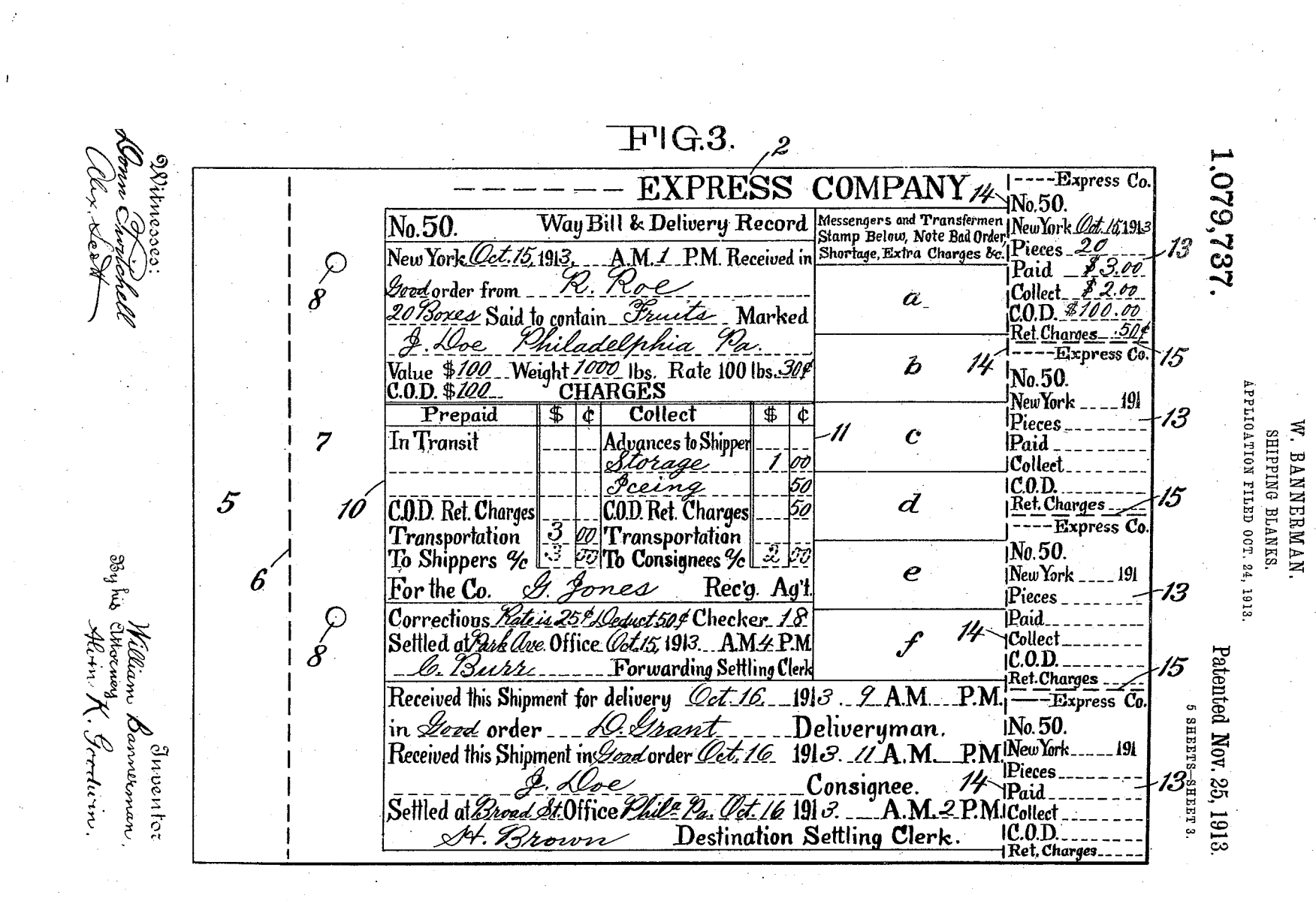

Figure 1 is a somewhat diagrammatic perspective view of a number of sets of the improved shipping blanks bound into an opened book, each set of preferably four blanks including a shipper's receipt, a waybill and delivery record, an auditor's record and a forwarding office record. Fig. 2 is a front face view of the shipper's receipt. Fig. 3 is a front face view of the way-bill and delivery record. Fig. 4 is a front face view of the auditor's record. Fig. 5 is a front face view of the forwarding office record; and Fig. 6 is a rear face view of a portion of said office record. In Figs. 2 to 6, the blanks are shown reduced about one-third from the normal size of use.

The improved blanks will first be described and their novel features will then be particularly defined in claims hereinafter set forth.

The numeral 1 indicates the shipper's receipt blank, the numeral 2 indicates the waybill and delivery record blank, the numeral 3 indicates the auditor's record blank, and the numeral 4 indicates the forwarding office record blank. Each of these four blanks preferably has a left-hand edge binding space 5, separated by a line of perforations or indentations 6, from a filing space 7, which has holes 8, 8, to receive pins of a leaf binder or file device and permitting later filing of the severed blanks. Said blanks 1, 2, 3, 4, are preferably arranged in successive sets of four, and all four blanks of each set have the same serial number and the successive blank sets have successively higher serial numbers which give identifying numerical titles to the respective goods shipments. Any preferred number, say one hundred, of these serially numbered four-blank sets are originally bound into a book 9, shown in Fig. 1 of the drawings, and in consecutive serial number order from 1 to 100. The blanks 4, may or may not have severance perforations 6, as they will usually remain bound in the book 9, wherein they make a complete and easily accessible forwarding office numerical record of all shipments for which correspondingly numbered removed blanks 1, 2, 3, have been used. Perforating the blanks 4, at 6, as shown, permits their convenient removal from the book 9, at any later time should it then be desirable to save storage space for the forwarding office records of old shipments.

The blanks 1, 2, 3, 4, have the following imprints preferably including the carrier's title at the top such as "———— Express Company" under which appears the shipment serial number imprint shown as "No. 50." and the special title of each blank and which for blank 1, is "shipper's receipt." for blank 2, is "Way-bill and delivery record." for blank 3, is "Auditor's record." and for blank 4, is "Forwarding office record." Under said serial number and special title imprints each blank 1, 2, 3, 4, has similarly located imprints such as "———— 191—. ———— A. M. ———— P. M." permitting entry of the place, date and hour of receipt of the shipment, but for use in large cities or towns the city name or district office may also be printed, as shown by imprint "New York." preceding said date and hour imprints. Following the place, date and hour imprints each blank 1, 2, 3, 4, has similarly located imprints "Received in ———— order from ———— said to contain ————." "Marked ——." "Value $——" "C. O. D. $——." "Weight —— lbs." "Rate 100 lbs. ——" next which is a caption imprint "Charges" followed preferably by two charge divisions for financial data and having respective heading imprints "Prepaid $——¢" and "Collect $——¢." Under the imprint "Prepaid" the blanks 1, 2, 3, 4, have similarly located imprints "In transit." with a few adjacent spaces for entering any estimable transit charges which the shipper wishes to prepay, and under said spaces appears the imprint "C. O. D. ret. charges." followed by imprints "Transportation" and "To shipper's ac." Under said "collect" heading imprint the blanks 1, 2, 3, 4, have an imprint "Advances to shipper." with following spaces for entry of such advances and under said spaces all four blanks have successive imprints "C. O. D. ret. charges." and "Transportation" under which the way-bill blank alone has the imprint "To consignee's ac." Spaces on all four blanks under the charges prepaid and collect "$——¢" imprints, permit entry of the amounts paid or chargeable, and the totals of all the above named "Charges" items may readily be entered at the bottoms of the respective "$——¢" columns. Following imprints "For the Co.——Rec'g. ag't." provide for the signature or stamp on all four blanks of the carrier's goods receiving driver or agent. Under said imprints "For the Co.——Rec'g. ag't." appear only on the blanks 2, 3, 4, the imprints "Corrections —— Checker ——." and under these appear imprints "Settled at—— Office——191–. —— A. M.——P. M." under which is a signature space followed by the signer's title imprint "Forwarding settling clerk."

All the above named imprints from the blank serial number and special title down to and including "Forwarding settling clerk." are arranged between two vertical parallel line imprints 10, 11, and the backs of the blanks 1, 2, 3, preferably have applied to them in the area between said lines 10, 11, a carbon backing or coating 12, causing all writings of the "Rec'g. ag't." on the shipper's receipt blank 1, and all writings of the "Correction checker" and the "Forwarding settling clerk" on the way-bill blank 2, to be carbon-duplicated or reproduced on all underlying blanks of any like numbered blank set or series, a tin plate or paper board being placed under the last blank 4, of the series to prevent carbon markings on the next underlying set of blanks. To the right of its imprinted line 11, and if space so demands also below the above named imprints "For the Co.—— Rec'g ag't." are preferably imprinted on the front face of the shipper's receipt blank 1, the usual "Conditions." under which the carrier assumes risks regarding a shipment. The shipper thus holds a complete record of such conditions, and in order to assure that a full duplicate of the shipper's receipt shall remain in the carrier's hands, the same "Conditions." are imprinted on the uncarbonized back of the last blank of any set of blanks, in this case upon the back of the forwarding office record blank 4, as shown in Figs. 1 and 6, of the drawings.

To the right of its line 11, the way-bill blank 2, alone has messengers' and transfermen's imprints and spaces having any suitable caption such as "Messengers and transfermen stamp below. Note bad order, shortage, extra charges, &c." Six stamping and entry spaces a, b, c, d, e, f, appear below this caption. To the right of these spaces there is provided on the way-bill blank 2, a series of pasters 13, spaced from the main body of the blank by severance lines of perforations 14, and from each other by severance perforations 15, permitting detachment of one or more pasters which may be required for any particular shipment. A series of four pasters 13, are shown and they all have like imprints "—— Express Co." "No. 50." "New York —— 191–." "Pieces. ——." "Paid. ——." "Collect. ——." "C. O. D. $——." "Ret. charges. ——." These pasters are useful in four ways, and their backs may or may not be gummed to facilitate affixing directly to one or more pieces of a shipment. The way-bill blank 2, alone has under its above named imprints "Forwarding settling clerk" a series of imprints indicating matter to be filled in at destination and including a deliveryman's receipt to the carrier, a consignee's receipt for the delivered goods, and the attest of a destination settling clerk to full equitable completion of the carrier's contract. These way-bill imprints are shown as "Received this shipment for delivery —— 191–. A. M. —— P. M. in —— order. —— Deliveryman." followed by "Received this shipment in —— order. —— 191–. —— A. M. —— P. M. —— Consignee," followed by "Settled at —— Office —— 191–. —— A. M. —— P. M. —— Destination settling clerk." The last above named imprints on the way-bill blank 2, requires that it be wider vertically than the other three blanks 1, 3, 4, of the same series which preferably have like vertical dimensions. Because the shipper's receipt blank 1, must bear the imprinted "Conditions" and also must have a carbon backing 12, said blank 1, has the same horizontal length as blank 2, while the blanks 3, 4, may be shorter as they may end at their vertical lines 11, but it is preferred to extend them to the right of said lines for about one inch which allows handling of the severed record blank 3, without smudging the fingers by its carbon backing 12, laid on between the lines 10, 11; and allows free handling of the record blank 4, without smudging the "Conditions." printed on its back face between the lines 10, 11.

Practical use of this improved shipping blank system will be explained relatively to a shipment of twenty boxes of fruits from R. Roe of New York, to J. Doe of Philadelphia, this being a "C. O. D." shipment on which shipper Roe prepays the actual transportation charges while consignee Doe is to pay the "C. O. D. ret. charges" and certain advances of the carrier for "Icing" and "Storage." We will assume that the carrier's goods receiving agent is G. Jones, the forwarding settling clerk is C. Burr, the destination deliveryman is D. Grant, and the destination settling clerk is H. Brown. When driver Jones receives the goods he fills-in blank 1, of the first unused blank series in his book 9, which may happen to be "No. 50." so it reads "New York. Oct. 15. 1913. Received in good order from R. Roe, 20 boxes. Said to contain fruits. Marked J. Doe. Philadelphia. Pa. Value $100. C. O. D. $100. Weight 1000. lbs. Rate 100 lbs. 30¢." Jones also enters under "Charges prepaid" and opposite "Transportation." the sum of "$3.00." which shipper Roe may prepay in cash, but if Roe has a regular account with the carrier, driver Jones will enter "3.00" only opposite the subjacent imprint "To shippers ac." as indicated by dotted lines in Fig. 2 of the drawings, or this charge entry of "3.00" may later be made by another employee of the carrier when he checks the way-bill blank 2, and will be carbon-duplicated on the blanks 3, 4, as indicated thereon by dotted lines in Figs. 4 and 5 of the drawings. Driver Jones may also enter on the blank 1, under "Charges collect" and opposite the proper imprints the charge items consignee Doe is to pay at destination, these being the carrier's advances of $1.00. for storage, .50¢ for icing, and .50¢ for "C. O. D. ret. charges", in addition to the C. O. D. collection of $100. Jones also fills in one of the pasters 13, on the way-bill blank 2, to have it read "——— Express Co. No. 50. New York. Oct. 15, 1913. Pieces 20. Paid $3.00. Collect $2.00. C. O. D. $100. Ret. charges .50¢." Jones now signs the blank 1, by writing his name "G. Jones." after the imprint "For the Co." and he then tears this blank 1, from the book 9, along the perforations 6, and hands said severed blank to shipper Roe as his receipt or voucher. Driver Jones also tears the filled-in paster 13, from the blank 2, and affixes it to one of the boxes of the shipment, or to a single box or package were there but one. Should driver Jones not have time, or should he neglect, to fill-in the paster 13, and apply this detached paster to the box or package, this work shall be done by settling clerk Burr, or by his assistant, after delivery of the shipment by Jones at the carrier's first forwarding office. All matter written by driver Jones upon the receipt blank 1, had by means of the carbon backings 12, on the blanks 1, 2, 3, been reproduced on the blanks 2, 3, 4. When driver Jones deposits this shipment at the carrier's forwarding office he there also temporarily leaves his book 9, containing the blanks 2, 3, 4, having the serial number "50." Said shipment now passes under the control of forwarding settling clerk Burr, who first sees to it that the serial "No. 50." of the filled-in paster 13, already on or to be fixed by him to the box or package, tallies, with the serial number on the carbon-transcribed blanks 2, 3, 4, in the book, and that the full number of "20 boxes" called for by this receipt "No. 50." are all deposited and are in the alleged good order. Driver Jones thus is checked by clerk Burr to protect both shipper Roe and the carrier from loss or theft by Jones of any shipment or part thereof receipted for by him. Clerk Burr also specially sees to it that all cash prepaid charges collected from shipper Roe by driver Jones, and by him entered on the blanks 2, 3, 4, are at once surrendered by Jones who thus is checked by Burr to prevent Jones from holding over from day-to-day, or from stealing, any prepaid cash receipts. Clerk Burr also may prove that the stated weight of the shipment "1000 lbs." is correct, and if not he corrects the weight entry on the blank 2, by canceling "1000." and writing in the correct weight. Clerk Burr also notices the hour time, say 1 p. m., when Jones received the goods from shipper Roe, and by comparison with the time of deposit of this shipment by Jones at the carrier's office, Burr may detect unreasonable delay and report driver Jones to an investigating wagon-master. Clerk Burr also sees to it that the consignee's address and other shipment data appearing on the packages corresponds with such address and data on the way-bill blank as written by Driver Jones, and Burr also makes any corrections needed on the blank 2, and shown as "Rate is .25¢. Deduct .50¢" or Burr inspects this correction data made by his assistant who has written his identifying mark shown as 18, after the imprint "Checker." The absence of such mark implies that clerk Burr has himself made the above named rate correction. Burr then writes his attesting data on the way-bill blank 2, below driver Jones's signature to have it read "Settled at Park Ave. Office. Oct. 15. 1913. 4 p. m." and he then signs his name "C. Burr." next his official title imprint "Forwarding settling clerk." All writings of Burr and of his correction clerk, on the way-bill blank 2, are reproduced by the carbon backings 12, upon the underlying similarly numbered blanks 3, 4, which thus show like shipment ownership and financial data as written both by driver Jones and clerk Burr.

It may here be stated that one of the pasters 13, having a serial number, say "No. 50." is adapted for use as a temporary receipt to the shipper should his goods be hurriedly given to driver Jones. In such case Jones fills-in two pasters 13, with the few necessary items and tears both pasters from the blank 2, and affixes one paster to the package and gives the other one to shipper Roe as a temporary receipt, it being presumed that Roe's name and address are on the usual shipping label fixed to the box or package and which also bears the consignee's name and address. The shipper may later exchange this temporary paster receipt for a full regular receipt having the same serial "No. 50." at the carrier's office where said full receipt is prepared by clerk Burr after driver Jones deposits the shipment and the book 9, with him; or driver Jones may deliver said full receipt to the shipper in exchange for his temporary paster receipt when Jones later calls for other shipments.

After forwarding settling clerk Burr signs the blank 2, it is ready for use as a carefully verified way-bill, and the tedious writing out of a separate way-bill before forwarding the shipment is avoided thus preventing delay in transit, and by the same writings of driver Jones and clerk Burr the blanks 3 and 4, are made ready to serve as the carrier's shipment records. Blank 3, is torn from the book 9, along its perforations 6, and is sent to the auditor who effects usual final settlements between all parties interested in ownership or transportation of the shipment, while blank 4, is left bound within the book 9. All the book-bound blanks 4, thus constitute a permanent and consecutively numbered and therefore easily accessible forwarding office record of outgoing shipments from any office or station of the carrier.

After signing the way-bill blank 2, clerk Burr tears it from the book 9, along the line of perforations 6, and sends it forward promptly with the goods shipment toward destination, and probably by a transfer wagon to the railway train or boat. With use of prior shipping blank systems too many packages are lost or tampered with during said transfer, due to the fact that no check or insufficient check is placed upon the transfer wagon driver. This serious disadvantage is readily overcome when using my shipping blank system by taking what is practically a receipt from said transfer wagon driver in the form of one of the serially numbered pasters 13, which forwarding settling clerk Burr tears from the way-bill blank 2, and on which Burr stamps the identifying name or mark of the driver, or said driver may himself sign or stamp said serially numbered paster receipt. Clerk Burr keeps this signed or stamped paster a sufficient time to receive notice of loss or damage of the package so he may at once hold responsible the transfer driver to whom he delivered it, this being a second and important function of the detachable pasters 13. All messengers and transfer men under whose control this shipment "No. 50." comes while in transit from New York to Philadelphia will assume responsibility for it by writing their names or stamping their identifying symbols in the successive spaces $a$, $b$, $c$, etc., of said way-bill blank 2, and will also note thereon if the shipment be in bad order, or if there be shortage in number of packages or in weight, or if there be accrued extra charges to collect at destination. If any messenger receives a shipment without receiving a way-bill for it he will prepare a substitute way-bill which he at once sends with the shipment to destination.

When this "Roe" shipment "No. 50." arrives at Philadelphia, it passes under control of destination settling clerk Brown, who places it in care of driver Grant who gives his receipt on the way-bill for the shipment intrusted to him for delivery and reading "Received this shipment for delivery on Oct. 16, 1913, at 9 A. M. in good order. D. Grant, deliveryman." Under this safeguarding receipt driver Grant gets the consignee's receipt for the delivered goods here reading "Received this shipment in good order, Oct. 16, 1913, at 11 A. M. J. Doe, consignee," it being understood that Grant has received from Doe all moneys payable on the shipment including the C. O. D. sum of "$100." the C. O. D. return charge of .50¢, and the advanced storage and icing charges of $1.00 and .50¢, or $102. in all. Should consignee Doe have a regular account with the carrier, Grant will collect from Doe only the "$100. C. O. D." charge and will fill-in on blank 2, the remaining sum total of "$2.00" opposite the imprint "To consignee's ac.", as indicated by dotted lines in Fig. 3 of the drawings, or this $2.00 charge item may there be later recorded by settling clerk Brown after Grant returns to him the receipted way-bill and surrenders all cash paid by consignee Doe on the delivered shipment. If no special provision be made on the way-bill blank 2, for taking deliveryman Grant's receipt, settling clerk Brown may tear from said blank one of its remaining pasters 13, having the serial "No. 50." and hold it as evidence of intrusting said shipment to driver Grant until he returns with the way-bill bearing the consignee's receipt, this being a third useful function of the serially numbered pasters 13. If perchance the way-bill 2, becomes separated from the shipment while in transit, and this shipment "No. 50." first reaches destination, the paster 13, on the box or package supplies sufficient data to enable clerk Brown to make immediate delivery of the shipment to consignee Doe if Brown first makes memoranda of the data entered on said affixed paster and receives from Doe all cash the paster states is payable on the shipment, or the "C. O. D. $100" the "Charges collect $2.00," and the "Ret. charges .50¢," and has understanding with Doe that any other unpaid charges recorded on the way-bill will be promptly paid when said way-bill is found, or after clerk Brown receives notice of the amount of said unpaid charges from the carrier's forwarding office or from messengers or transfermen who may have handled the shipment while in transit. The pasters 13, thus have a fourth useful function of facilitating quick delivery of a shipment to the consignee before arrival at destination of a delayed way-bill. As the paster fixed to a box or package notifies the destination settling clerk, the deliveryman and the consignee of all charges which have been prepaid by the shipper, it will be practically inexcusable for the carrier to collect such prepaid charges a second time. After delivery of this shipment "No. 50." to consignee Doe, clerk Brown fills-in the settling data under Doe's receipt so it reads "Settled at Broad St. Office. Phil'a. Pa. Oct 16. 1913. 2 P. M." and he then signs his name "H. Brown." next his official title "Destination settling clerk." Brown surrenders to the carrier's proper officer at destination all the cash receipts for each day, with his attested way-bills 2, of the delivered shipments. Any pasters 13, remaining on the way-bill blanks 2, after delivery of shipments will be detached and thrown away by clerk Brown prior to final placing of said blanks in the carrier's reference files by engaging the holes 8 of blank spaces 7, with the file pins.

Destination clerk Brown has the same supervisory control over deliveryman Grant to prevent his stealing or tampering with goods shipments, and to demand immediate full surrender of his cash collections, and to detect loitering by him, as clerk Burr has over driver Jones at the carrier's first forwarding office. When all hereinabove named duties of these two responsible settling clerks Burr and Brown are well performed and so certified by their signatures, and more especially the duties of forwarding settling clerk Burr, it follows that a maximum measure of safety of all shipments and the cash payments thereon are assured. All filled-in shipment data on these shipping blanks certifies to all following carrier's employees or agents the identity of all employees or agents who had previously handled and become responsible for a goods shipment which thus is continuously guarded and traceable from the hour of its receipt by the carrier to the hour of its delivery to the consignee. A further advantage gained by use of these improved shipping blanks is that much of the checking and accounting usually done at a possibly distant auditor's office may be easily done at once and directly by the forwarding settling clerk at the carrier's original forwarding office where most of the mistakes now are usually made, it being obvious that the specially important scrutiny of said forwarding settling clerk should minimize or avoid mistakes in shipment data.

It is obvious that the imprints "Settling clerk" need not be preceded by the words "Forwarding" and "Destination", as the used blanks sufficiently identify the respective settling clerks' offices. Furthermore, the carrier's receipt to the shipper may be completed by its receiving agent stamping his signature or mark on the blanks 1, 2, 3, 4, and stamps also may be used by the forwarding and destination settling clerks to imprint their certified settling data, and stamps also may be used for imprinting necessary data on detachable portions of the way-bill blank 2, which form the specially useful "pasters" hereinabove described, it being immaterial whether said matter be partially imprinted and be later filled-in by hand-writing, or be partially or wholly imprinted by stamping processes. Separate carbon sheets may be bound in the book 9, in front of the blanks 2, 3, 4, or loose carbon sheets also may be substituted for the more desirable permanent carbon coatings 12, on the backs of the blanks 1, 2, 3.

In accordance with the terms of one or more of the appended claims it is immaterial whether the carrier retain two or three or more reference record blanks of any one shipment; as for instance, the invention would be useful as concerns safety of shipments and assurance of equitable charges therefor if the forwarding office record blank 4, were omitted and each blank set comprised but three blanks 1, 2, 3. There also may be more than four blanks in each set, depending upon the limit of legible carbon duplication of writings on the first or shipper's receipt blank 1, and depending also upon the carrying out of any special plan which may be preferred by users of this improved blank system who may modify it in manner suggesting itself to experienced managers of express, freight or mail carriers.

I claim as my invention:—

1. Shipping blanks comprising shipper's receipt, way-bill, and record blanks each having imprints and spaces providing for entry of shipment ownership and financial data and for signature of the carrier's receiving agent, said way-bill blank also having imprints and spaces providing for entry of the inspection attest of the carrier's forwarding settling clerk, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

2. Shipping blanks comprising shipper's receipt, way-bill, and record blanks each having imprints and spaces providing for entry of shipment ownership and financial data and for signature of the carrier's receiving agent, said way-bill and record blanks also having below said space for the receiving agent's signature further imprints and spaces for entering corrections of said shipment data, and said way-bill and record blanks also having below said correction imprints further imprints and spaces providing for entry of the inspection attest of the carrier's forwarding settling clerk, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

3. Shipping blanks comprising shipper's receipt, way-bill, and record blanks each having imprints and spaces providing for entry of shipment ownership and financial data and for signature of the carrier's receiving agent, said way-bill blank also having imprints and spaces providing for entry of the inspection attest of the carrier's forwarding settling clerk, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, said blanks having like shipment serial number, substantially as described.

4. Shipping blanks comprising shipper's receipt, way-bill, and record blanks each having imprints and spaces providing for entry of shipment ownership and financial data and for signature of the carrier's receiving agent and for entry of the day and hour time when said agent received the shipment, said way-bill blank also having imprints and spaces providing for entry of the inspection attest of the carrier's forwarding settling clerk, like imprints and spaces of the respective blanks being similarly located to be in registration when the blanks are superposed, and means transferring to said way-bill and record blanks the receiving agent's writings on the shipper's receipt blank and transferring to the record blank the forwarding settling clerk's writings on the way-bill blank, substantially as described.

5. Shipping blanks comprising shipper's receipt, way-bill, and record blanks each having imprints and spaces providing for entry of shipment ownership and financial data and for signature of the carrier's receiving agent, said way-bill blank also having imprints and spaces providing for the consignee's receipt to the carrier for a delivered shipment and for entry of the inspection attests of settling clerks at the carrier's forwarding and destination offices, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

6. Shipping blanks comprising shipper's receipt, way-bill, and record blanks each having imprints and spaces providing for entry of shipment ownership and financial data and for signature of the carrier's receiving agent, said way-bill blank also having imprints and spaces providing for destination deliveryman's and consignee's receipts to the carrier and for entry of the inspection attests of settling clerks at the carrier's forwarding and destination offices, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

7. Shipping blanks comprising shipper's receipt, way-bill, and record blanks each having imprints and spaces providing for entry of shipment ownership and financial data and for signature of the carrier's receiving agent, said way-bill blank also having imprints and spaces providing for destination deliveryman's and consignee's receipts to the carrier and for entry of the inspection attests of settling clerks at the carrier's forwarding and destination like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, said blanks having like shipment serial number, substantially as described.

8. Shipping blanks comprising shipper's receipt, way-bill, and record blanks each having imprints and spaces providing for entry of shipment ownership and financial data and for signature of the carrier's receiving agent, said way-bill blank also having imprints and spaces providing for a destination deliveryman's receipt to the carrier including entry of the day and hour time when the shipment was intrusted to him, and imprints and spaces providing for the consignee's receipt for a delivered shipment, and for entry of the day and hour time when the consignee received the shipment, and for entry of the inspection attests of the carrier's forwarding and destination settling clerks, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

9. Shipping blanks comprising shipper's receipt, way-bill, and record blanks each having imprints and spaces providing for entry of shipment data and for signature of the carrier's receiving agent, said shipment data on all the blanks including two "Charges" divisions respectively having heading imprints "Prepaid. $———¢" and "Collect. $———¢" each blank having under its "Prepaid" heading the imprints "In transit." "C. O. D. ret. charges." "Transportation." "To shippers ac.", and also having under its "Collect." heading the imprints "Advances to shipper." "C. O. D. ret. charges." "Transportation" and the way-bill blank having under its "Collect" heading an additional imprint "To consignees ac." like imprints and spaces of the respective blanks being similarly located to be in registration when the blanks are superposed, and means automatically transferring to said way-bill and record blanks the receiving agent's writings on the shipper's receipt blank, substantially as described.

10. Shipping blanks comprising shipper's receipt, way-bill, and record blanks each having imprints and spaces providing for entry of shipment data and for signature of the carrier's receiving agent, said shipment data on all the blanks including two "Charges" divisions respectively having heading imprints "Prepaid $———¢" and "Collect $———¢" each blank having under its "Prepaid" heading the imprints "In transit" "C. O. D. ret. charges" "Transportation" "To shippers ac." and also having under its "Collect" heading the imprints "Advances to shipper" "C. O. D. ret. charges" "Transportation" and the way-bill blank having under its "Collect" heading an additional imprint "To consignee's ac." said way-bill blank also having imprints and spaces providing for entry of the inspection attest of the carrier's forwarding settling clerk, like imprints and spaces of the respective blanks being similarly located to be in registration when the blanks are superposed, and means automatically transferring to said way-bill and record blanks the receiving agent's writings on the shipper's receipt blank and transferring to the record blank the forwarding settling clerk's writings on the way-bill blank, substantially as described.

11. A shipping way-bill blank having shipment identifying serial number and also having imprints and spaces providing for entry of shipment ownership and financial data, said way-bill blank having one or more detachable pasters bearing like serial number and useful as a temporary receipt to the shipper from the carrier and for identifying application to a shipment package before it leaves the carrier's first forwarding office and for temporary receipts from the carrier's forwarding-transfer and destination-deliveryman drivers, and also permitting safe delivery of a shipment bearing an attached paster prior to receipt at destination of a delayed way-bill, said pasters also having imprints and spaces providing for entry of shipment data including unpaid carrier's charges payable by consignee at destination, substantially as described.

12. A shipping way-bill blank having shipment identifying serial number and also having imprints and spaces providing for entry of shipment ownership and financial data, said way-bill blank having one or more detachable pasters bearing like serial number and useful as a temporary receipt to the shipper from the carrier and for identifying application to a shipment package before it leaves the carrier's first forwarding office and for temporary receipts from the carrier's forwarding-transfer and destination-deliveryman drivers, and also permitting safe delivery of a shipment bearing an attached paster prior to receipt at destination of a delayed way-bill, said pasters also having imprints and spaces providing for entry of shipment data including special imprints "Pieces" "Paid" "Collect" "C.

O. D. ret. charges", thereby indicating if the carrier's charges be fully prepaid and if not so prepaid indicating the charges payable by consignee at destination, substantially as described.

13. Shipping blanks comprising shipper's receipt, way-bill, and record blanks each having like serial number and also having imprints and spaces providing for entry of shipment ownership and financial data and for signature of the carrier's receiving agent, said way-bill blank also carrying one or more detachable pasters each having a shipment serial number like that on the three above named blanks and also having imprints and spaces providing for entry of shipment identifying and financial data, a filled-in and detached paster being adapted for use as a temporary receipt from the carrier to the shipper or from a receiving office transferman to the carrier or from a destination office deliveryman to the carrier, a filled-in paster when applied to a package before it leaves the carrier's first forwarding office being adapted to later identify said package and facilitate its prompt delivery to the consignee before a delayed way-bill reaches destination, like imprints and spaces of the respective blanks being similarly located to be in registration when the blanks are superposed, and means automatically transferring to said way-bill and record blanks the receiving agent's writings on the shipper's receipt blank, substantially as described.

14. Shipping blanks comprising shipper's receipt, way-bill, and record blanks each having like serial number and also having imprints and spaces providing for entry of shipment ownership and financial data and for signature of the carrier's receiving agent, said way-bill blank also carrying one or more detachable pasters each having a shipment serial number like that on the three above named blanks and also having imprints and spaces providing for entry of shipment data, said way-bill blank also having imprints and spaces providing for entry of the inspection attest of the carrier's forwarding settling clerk, like imprints and spaces of the respective blanks being similarly located to be in registration when the blanks are superposed, means automatically transferring to said way-bill and record blanks the receiving agent's writings on the shipper's receipt blank and transferring to the record blank the forwarding settling clerk's writings on the way-bill blank, substantially as described.

15. Shipping blanks comprising shipper's receipt, way-bill, and record blanks each having like serial number and also having imprints and spaces providing for entry of shipment ownership and financial data and for signature of the carrier's receiving agent, said way-bill blank also carrying one or more detachable pasters adapted for identifying application to a package before it leaves the carrier's first forwarding office, each paster having a serial number like that on the three above named blanks, said pasters also having imprints including the carrier's title, and imprints and spaces providing for entry of the place and date of shipment, and further special imprints "Pieces," "Paid" "Collect" "C. O. D. ret. charges" with adjacent spaces for entering said special items, said way-bill blank also having imprints and spaces for entry of the inspection attest of the carrier's forwarding settling clerk, like imprints and spaces of the respective blanks being similarly located to be in registration when the blanks are superposed, means automatically transferring to said way-bill and record blanks the receiving agent's writings on the shipper's receipt blank and transferring to the record blank the forwarding settling clerk's writings on the way-bill blank, substantially as described.

16. Shipping blanks arranged in consecutively numbered sets, each set comprising shipper's receipt, way-bill, and record blanks, all blanks of each set having like shipment serial number and also having imprints and spaces providing for entry of shipment ownership and financial data and for signature of the carrier's receiving agent, said way-bill and record blanks also having imprints and spaces providing for entry of the inspection attest of the carrier's forwarding settling clerk, like imprints and spaces of the respective blanks being similarly located to be in registration when the blanks are superposed, means automatically transferring to the way-bill and record blanks the receiving agent's writings on the shipper's receipt blank and transferring to the record blank of each blank set the writings of the forwarding settling clerk on the way-bill blank of said blank set; the consecutively numbered sets of blanks being bound into a book from which the shipper's receipt and way-bill blanks for any shipment are severable while a forwarding office record blank of said shipment remains bound in the book to facilitate quick and easy reference to full data of the shipment, substantially as described.

17. Shipping blanks arranged in consecutively numbered sets of four comprising a shipper's receipt, a way-bill, an auditor's record, and a forwarding office record, all four blanks of each set having like shipment serial number, and also having imprints and spaces providing for entry of shipment ownership and financial data and for signature of the carrier's receiving agent, said way-bill, auditor's record, and imprints and spaces providing for entry of the inspection attest of the carrier's forwarding settling clerk, like imprints and spaces of the respective blanks being similarly located to be in registration when the blanks are superposed, means automatically transferring to the next underlying way-bill, auditor's record, and forwarding office record blanks the receiving agent's writings on the shipper's receipt blank of each blank set and transferring to said auditor's and forwarding office record blanks the forwarding settling clerk's writings on the way-bill blank of said blank set, substantially as described.

18. Shipping blanks arranged in consecutively numbered sets of four comprising a shipper's receipt, a way-bill, an auditor's record, and a forwarding office record, all four blanks of each set having like shipment serial number, and also having imprints and spaces providing for entry of shipment ownership and financial data and for signature of the carrier's receiving agent, like imprints and spaces of the respective blanks being similarly located to be in registration when the blanks are superposed, the shipper's receipt, way-bill, and auditor's record blanks having a carbon backing and the shipper's receipt having on its front face the imprinted "Conditions" of shipment which are duplicated on the back of the last carrier's record blank, whereby the receiving agent's writings on the shipper's receipt blank are reproduced through said carbon backings upon all underlying blanks of the same blank set, and whereby also the carrier has one office record which bears the imprinted "Conditions" similar to those appearing on the receipt blank held by the shipper, substantially as described.

19. Shipping blanks arranged in consecutively numbered sets of four comprising a shipper's receipt, a way-bill, an auditor's record and a forwarding office record, all four blanks of each set having like shipment serial number, and also having imprints and spaces providing for entry of shipment ownership and financial data and for signature of the carrier's receiving agent, said way-bill, auditor's record, and forwarding office record blanks also having imprints and spaces providing for entry of the inspection attest of the carrier's forwarding settling clerk, like imprints and spaces of the respective blanks being similarly located to be in registration when the blanks are superposed, the shipper's receipt, way-bill, and auditor's record blanks having a carbon backing and the shipper's receipt having on its front face the imprinted "Conditions" of shipment which are duplicated on the back of the last carrier's record blank, whereby the receiving agent's writings on the shipper's receipt blank and the forwarding settling clerk's writings on the way-bill blank are reproduced through said carbon backings upon all underlying blanks of the same blank set, and whereby also the carrier has one office record which bears the imprinted "Conditions" similar to those appearing on the receipt blank held by the shipper, substantially as described.

20. Shipping blanks arranged in consecutively numbered sets, each set comprising a shipper's receipt, a way-bill, an auditor's record, and a forwarding office record, all four blanks of each set having like shipment serial number and also having imprints and spaces providing for entry of shipment ownership and financial data and for signature of the carrier's receiving agent, said way-bill, auditor's record, and forwarding office record blanks also having imprints and spaces providing for entry of the inspection attest of the carrier's forwarding settling clerk, like imprints and spaces of the respective blanks being similarly located to be in registration when the blanks are superposed, means automatically transferring to the next underlying way-bill, auditor's record, and forwarding office record blanks the receiving agent's writings on the shipper's receipt blank of each blank set and transferring to the auditor's and forwarding office record blanks of each blank set the forwarding settling clerk's writings on the way-bill blank of said blank set; the consecutively numbered four-blank sets of blanks being bound into a book from which the shipper's receipt, way-bill and auditor's record blanks are readily severable while the forwarding office record blanks remain bound in the book for future reference at the carrier's first forwarding office, substantially as described.

WILLIAM BANNERMAN.

Witnesses:
ALVIN K. GOODWIN,
DONN TWITCHELL.